(12) United States Patent
Kano et al.

(10) Patent No.: US 7,946,366 B2
(45) Date of Patent: May 24, 2011

(54) DRIVING APPARATUS FOR VEHICLE

(75) Inventors: Seigo Kano, Anjo (JP); Masashi Kitou, Anjo (JP); Satoru Kasuya, Anjo (JP); Satoru Wakuta, Anjo (JP); Taku Sakai, Anjo (JP); Masataka Sugiyama, Toyota (JP); Yumi Iraha, Okazaki (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 445 days.

(21) Appl. No.: 12/081,606

(22) Filed: Apr. 17, 2008

(65) Prior Publication Data
US 2008/0258569 A1    Oct. 23, 2008

(30) Foreign Application Priority Data

Apr. 18, 2007 (JP) ................................. 2007-109892

(51) Int. Cl.
*B60K 17/04* (2006.01)
(52) U.S. Cl. ....... 180/65.6; 180/346; 903/952; 74/606 R
(58) Field of Classification Search ............... 180/65.21, 180/65.6, 65.7, 346, 374; 74/606 R, 607, 74/608; 903/952
See application file for complete search history.

(56) References Cited

U.S. PATENT DOCUMENTS

| 5,042,321 | A | * | 8/1991 | Hongo et al. ............... 74/606 R |
| 5,193,415 | A | * | 3/1993 | Massel ........................ 74/606 R |
| 7,056,260 | B2 | | 6/2006 | Nakamori et al. |
| 7,726,216 | B2 | * | 6/2010 | Hofmann et al. ........... 74/606 R |

FOREIGN PATENT DOCUMENTS

| JP | U 60-91841 | 6/1985 |
| JP | U 3-86757 | 9/1991 |
| JP | U 4-21730 | 2/1992 |
| JP | A 2004-159404 | 6/2004 |
| JP | A-2004-353782 | 12/2004 |
| JP | A 2007-58109 | 3/2007 |

* cited by examiner

*Primary Examiner* — J. Allen Shriver, II
*Assistant Examiner* — John D Walters
(74) *Attorney, Agent, or Firm* — Oliff & Berridge, PLC

(57) ABSTRACT

A vehicle driving apparatus includes a rotating electrical machine; a power transmitting gear mechanism; and a case in which the rotating electrical machine and the gear mechanism are housed in series in an axial direction of the rotating electrical machine, wherein a low rigidity region, which is a region of the case having low rigidity located at an outer periphery of the rotating electrical machine, is covered by a silencer supported on a high rigidity region of the case having a higher rigidity than the low rigidity region.

20 Claims, 9 Drawing Sheets

DRIVING APPARATUS FOR VEHICLE

INCORPORATION BY REFERENCE

The disclosure of Japanese Patent Application No. 2007-109892 filed on Apr. 18, 2007 including the specification, drawings and abstract is incorporated herein by reference in its entirety.

BACKGROUND

The present invention relates to a vehicle driving apparatus.

Japanese Patent Application Publication No. 2004-353782 discloses a hybrid vehicle driving apparatus 51, such as that shown in FIG. 12, as an example of a vehicle driving apparatus having a rotating electrical machine, a power transmitting gear mechanism, and a case that houses the rotating electrical machine and the gear mechanism in series in the axial direction of the rotating electrical machine. FIG. 12 is a side sectional view of the vehicle driving apparatus 51 described in Japanese Patent Application Publication No. 2004-353782. The vehicle driving apparatus 51 includes a damper apparatus 53, a first motor generator 54, a power distribution mechanism 55 that is a planetary gear mechanism, a second motor generator 56, and a speed change mechanism 57, which are arranged in sequence from a crankshaft 52 of an engine, not shown in the drawing, and housed in a case 58. Here, the speed change mechanism 57 is a planetary gear mechanism that includes two brakes 57a, 57b for switching the gear ratio by restricting the rotation of any one element of the mechanism.

The case 58 includes a first sub case 59, a second sub case 60, and a third sub case 61 in order from the crankshaft 52 side. The first sub case 59 and the second sub case 60, and the second sub case 60 and the third sub case 61, are fastened and fixed to each other by bolts, not shown in the drawing, via flanges 59a, 60a, 60b, 61a provided on respective joint portions thereof. Here, the second sub case 60 is formed integrally with an intermediate wall body 62 extending radially inward from an inner surface thereof, and the internal space of the second sub case 60 is divided into two by the intermediate wall body 62. The second motor generator 56 is housed on one axial end side (the left side in FIG. 12) of the intermediate wall body 62, and the speed change mechanism 57 is housed on the other axial end side (the right side in FIG. 12) of the intermediate wall body 62. The third sub case 61 is attached to the other axial end side of the second sub case 60 so as to cover the other axial end side of the speed change mechanism 57. An input shaft 57c of the speed change mechanism 57 is supported by a bearing 62a supported on the intermediate wall body 62, and an output shaft 57d is supported by a bearing 61b provided on the third sub case 61. Meanwhile, the first sub case 59 is attached to a front side of the second sub case 60. The damper apparatus 53, the first motor generator 54, and the power distribution mechanism 55 are incorporated into the interior of the first sub case 59.

SUMMARY

In the vehicle driving apparatus 51 described above, vibrations generated by the motor generators 54, 56, the power distribution mechanism 55, and the gear mechanisms such as the speed change mechanism 57, which are housed in the case 58, are transmitted to the case 58, and as a result, noise is generated from the case 58. In particular, vibrations are generated by the speed change mechanism 57, even when the engine is halted, because of the meshing of gears when the speed change mechanism 57 rotates in order to transmit the rotary driving force of the second motor generator 56 to an axle side. Moreover, the frequency of this vibration increases in accordance with the vehicle speed. Since noise caused by the vibration of the speed change mechanism 57 occurs when the engine does not generate noise, and since the frequency of this noise increases in accordance with the vehicle speed, the noise has a quality that is likely to irritate the driver of the vehicle.

In an attempt to suppress noise caused by vibrations of the speed change mechanism 57, the inventors of the present application provided a silencer covering a region of the case 58 on the outer periphery of the speed change mechanism 57 (to be referred to hereafter as a "speed change mechanism outer peripheral region 58A") to make the periphery of the speed change mechanism 57, i.e. the source of the vibration, soundproof. However, noise generated by the vibrations of the speed change mechanism 57 could not be suppressed effectively. It was then learned as a result of an investigation conducted by the inventors of the present application that noise was being generated from the case 58 in the following manner.

As shown in FIG. 12, in the vehicle driving apparatus 51 described above, the inner surface of the part of the case 58 that surrounds the outer periphery of the speed change mechanism 57 is formed in a comparatively complicated irregular shape due to the provision of a spline and the like for providing the brakes 57a, 57b and so on. Accordingly, the speed change mechanism outer peripheral region 58A of the case 58 has a comparatively high rigidity and does not vibrate easily. In contrast, both the inner surface and the outer surface of the part of the case 58 that surrounds the outer periphery of the second motor generator 56 are formed in a comparatively flat shape. Accordingly, the region of the case 58 on the outer periphery of the second motor generator 56 (to be referred to hereafter as a "second MG outer peripheral region 58B") has a comparatively low rigidity and vibrates easily. Therefore, the vibrations of the speed change mechanism 57, which is transmitted to the case 58 from the bearing 62a via the intermediate wall body 62 and from the bearing 61b via the third sub case 61 or the brakes 57a, 57b and so on, causes the second MG outer peripheral region 58B of the case 58, having a comparatively low rigidity, to vibrate such that a comparatively large noise is generated from this region 58B.

The present invention thus provides a vehicle driving apparatus that can suppress noise caused by the vibration of a gear mechanism such as a speed change mechanism effectively, enabling an improvement in the quietness of the vehicle. The present invention can also achieve other advantages.

A vehicle driving apparatus according to an exemplary aspect of the present invention includes a rotating electrical machine; a power transmitting gear mechanism; and a case in which the rotating electrical machine and the gear mechanism are housed in series in an axial direction of the rotating electrical machine, wherein a low rigidity region, which is a region of the case having low rigidity located at an outer periphery of the rotating electrical machine, is covered by a silencer supported on a high rigidity region of the case having a higher rigidity than the low rigidity region.

A vehicle driving apparatus according to an exemplary aspect of the present invention includes a rotating electrical machine; a power transmitting gear mechanism; a case in which the rotating electrical machine and the gear mechanism are housed in series in an axial direction of the rotating electrical machine; and a silencer placed on a portion of the case, wherein the silencer covers a region of the case that is opposite an outer periphery of the rotating electrical machine, and the silencer is supported on a region of the case that is opposite the gear mechanism.

BRIEF DESCRIPTION OF THE DRAWINGS

Various exemplary embodiments of the invention will be described with reference to the drawings, wherein.

DETAILED DESCRIPTION OF EMBODIMENTS

Figure 1:
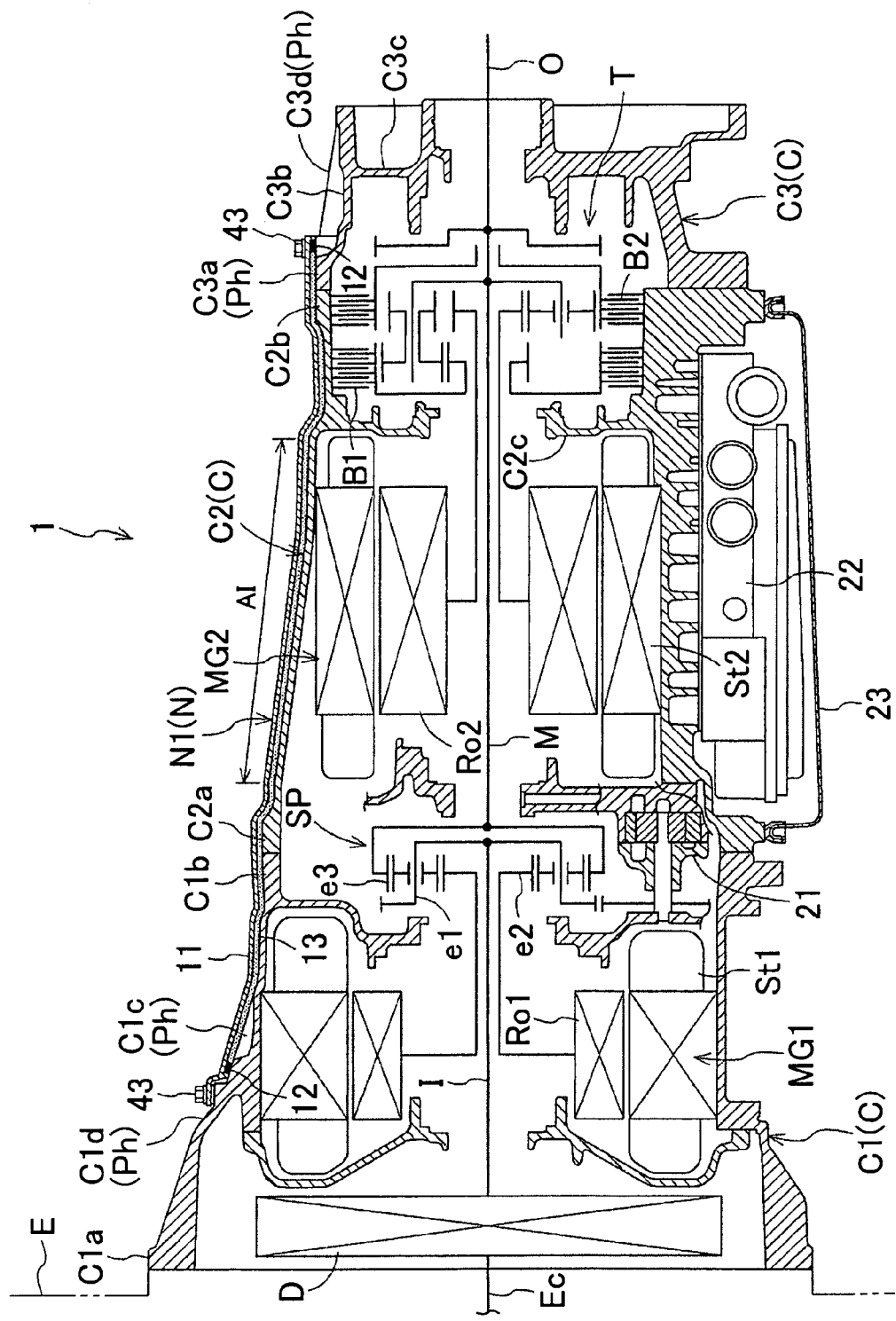
FIG. 1 is a sectional pattern diagram showing the overall structure of a vehicle driving apparatus according to an embodiment of the present invention.
Figure 2:
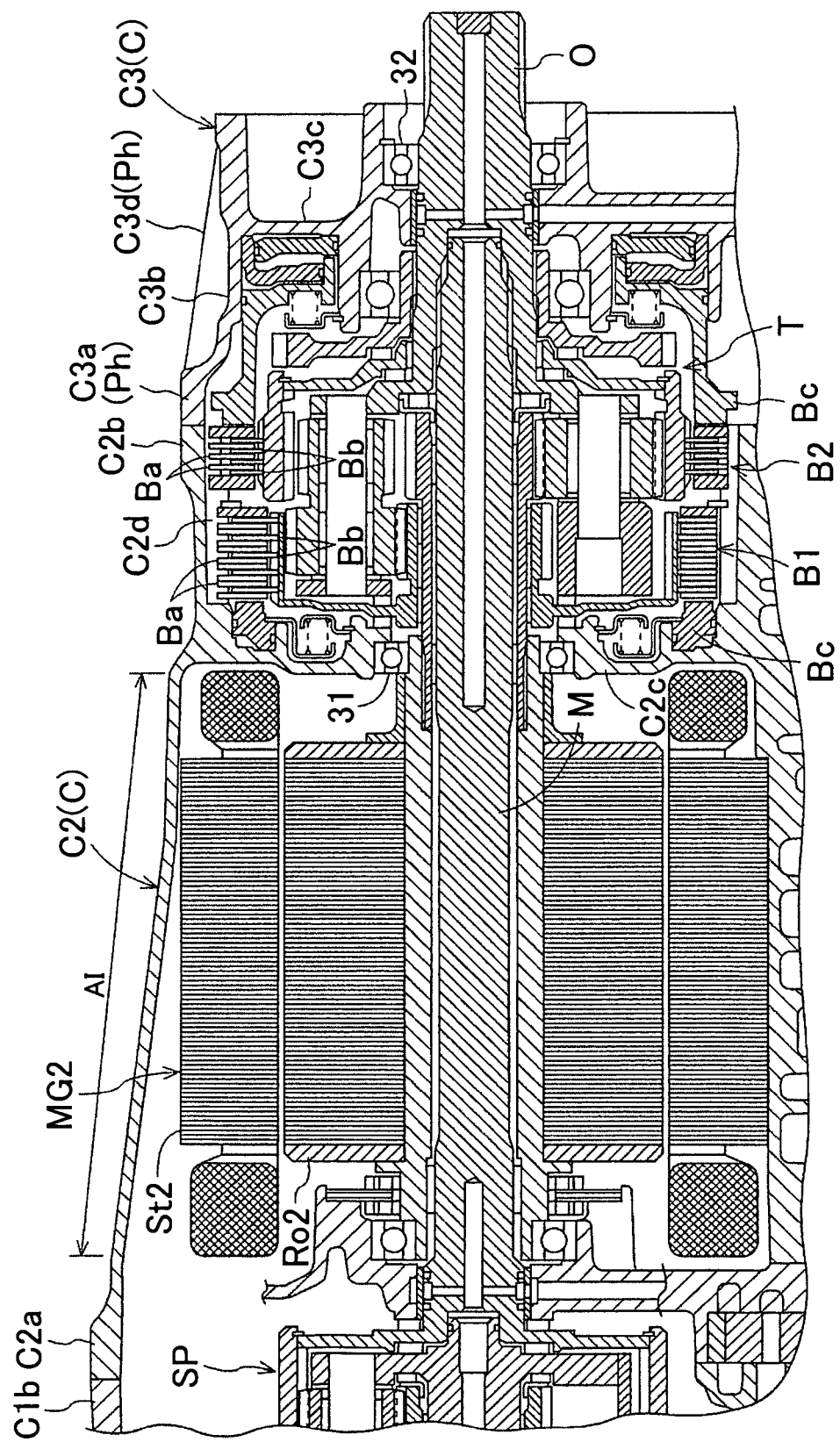
FIG. 2 is an enlarged view showing the main parts of FIG. 1.

An embodiment of the present invention will be described below on the basis of the drawings. In this embodiment, an example in which a vehicle driving apparatus 1 is a driving apparatus for a hybrid vehicle into which a driving force generated by an engine E is input, and which includes two motor generators, namely, a first motor generator MG1 and a second motor generator MG2, will be described. FIG. 1 is a sectional pattern diagram showing the overall structure of the vehicle driving apparatus 1 according to this embodiment. In this drawing, an internal structure, in which the engine E, the first motor generator MG1, the second motor generator MG2, a power distribution mechanism SP, a speed change mechanism T, and so on are housed in a case C, is illustrated in pattern form. FIG. 2 is an enlarged view of the main parts of FIG. 1, and shows the internal structure including the second motor generator MG2, the speed change mechanism T, and so on in detail. Note that in FIG. 2, a silencer N is omitted.

Overall Structure

As shown in FIG. 1, the main structure of the vehicle driving apparatus 1 includes the first motor generator MG1, the second motor generator MG2, the power distribution mechanism SP, and the speed change mechanism T. The vehicle driving apparatus 1 is structured using a split system such that the driving force transmitted from the engine E via a damper apparatus D is distributed to the first motor generator MG1 and an output shaft O as necessary by the power distribution mechanism SP. Each of these structures is housed in the interior of the case C, which takes the shape of a tube that is elongated in a front-rear direction. More specifically, the first motor generator MG1, the power distribution mechanism SP, the second motor generator MG2, and the speed change mechanism T are housed in the case C in axial sequence from the engine E side toward the output shaft O side. Further, the silencer N is provided to cover a low rigidity region A1, which is a region of the case C having low rigidity on the outer periphery of the second motor generator MG2. The vehicle driving apparatus 1 also includes a hydraulic control apparatus 22 that performs control to supply oil supplied from an oil pump 21 to each portion in the interior of the vehicle driving apparatus 1, and an oil pan 23 for storing the oil, which are provided on a lower side of a second sub case C2 of the case C. The output shaft O of the vehicle driving apparatus 1 transmits a driving force to a vehicle wheel via a differential apparatus, a four-wheel drive transfer apparatus, and so on, none of which are shown in the drawing.

The structure of each portion of the vehicle driving apparatus 1 will now be described in detail. Note that in the description of this embodiment, the side of a crankshaft Ec that is driven by the engine E (the left side in FIG. 1) will be referred to as the "front side," and the output shaft O side (the right side in FIG. 1) will be referred to as the "rear side." Further, the side of the case C on which the oil pan 23 is provided (the lower side in FIG. 1) will be referred to as the "lower side," and the opposite side thereto (the upper side in FIG. 1) will be referred to as the "upper side." Further, from the rear side toward the front side, the right side will be referred to as the "right side" and the left side will be referred to as the "left side."

Internal Structure

As the internal structure housed in the case C, the vehicle driving apparatus 1 includes the first motor generator MG1, the second motor generator MG2, the power distribution mechanism SP, and the speed change mechanism T. Further, an input shaft I, an intermediate shaft M, and the output shaft O are disposed in the vehicle driving apparatus 1 in sequence from the front side on an extension of an axial center of the crankshaft Ec. The damper apparatus D is provided between the crankshaft Ec and the input shaft I. The damper apparatus D is an apparatus for damping vibration in a rotary direction of the crankshaft Ec and then transmitting the vibration to the input shaft I. A rear end portion of the input shaft I is connected to a carrier e1 of the power distribution mechanism SP. Note that the damper apparatus D need not necessarily be provided.

The power distribution mechanism SP is a single pinion-type planetary gear mechanism disposed coaxially with the input shaft I. More specifically, the power distribution mechanism SP includes the carrier e1, which supports a plurality of pinion gears, and a sun gear e2 and a ring gear e3 that mesh respectively with the pinion gears. In the power distribution mechanism SP, the carrier e1 is connected to the input shaft I, the sun gear e2 is connected to a rotor Ro1 of the first motor generator MG1, and the ring gear e3 is connected to the intermediate shaft M. Thus, the power distribution mechanism SP distributes a driving force transmitted to the carrier e1 from the engine E via the input shaft I to the first motor generator MG1 and the intermediate shaft M through torque control of the first motor generator MG1. Note that the driving force distributed to the first motor generator MG1 is mainly used for power generation, while the driving force transmitted to the intermediate shaft M is mainly used for vehicle travel.

The first motor generator MG1 includes a stator St1 fixed to the case C, and the rotor Ro1, which is supported rotatably on the radial inner side of the stator St1. The rotor Ro1 of the first motor generator MG1 is connected to the sun gear e2 of the power distribution mechanism SP so as to rotate integrally therewith. The second motor generator MG2 includes a stator St2 fixed to the case C, and a rotor Ro2 supported rotatably on the radial inner side of the stator St2. The rotor Ro2 of the second motor generator MG2 is connected to an input side rotary element of the speed change mechanism T so as to rotate integrally therewith, and is capable of transmitting a driving force to the output shaft O via the speed change mechanism T. The first motor generator MG1 and the second motor generator MG2 are each electrically connected to a battery serving as a storage apparatus via an inverter, not shown in the drawing. The first motor generator MG1 and the second motor generator MG2 are each capable of functioning as a motor that receives a power supply and generates motive power, and as a generator that receives a power supply and generates electric power.

In this example, the first motor generator MG1 performs power generation using a driving force input mainly via the sun gear e2, and supplies power for charging the battery or driving the second motor generator MG2. Note, however, that when the vehicle travels at high speed, the first motor generator MG1 sometimes functions as a motor. Meanwhile, the second motor generator MG2 functions mainly as a drive motor for supplementing the driving force that enables the vehicle to travel. Note, however, that when the vehicle decelerates and so on, the second motor generator MG2 functions as a generator that regenerates the inertial force of the vehicle as electric energy. Operations of the first motor generator MG1 and second motor generator MG2 are performed in accordance with control commands from a control apparatus, not shown in the drawing. In this embodiment, the second motor generator MG2 corresponds to a "rotating electrical machine" of the present invention.

The speed change mechanism T is a single planetary gear mechanism or a combination of a plurality of planetary gear mechanisms. More specifically, the speed change mechanism T includes, as the rotary elements of the planetary gear mechanism, a carrier that supports a plurality of pinion gears, and a sun gear and a ring gear that mesh with the pinion gears. Hence, the speed change mechanism T generates a vibration when the gears mesh during rotation of the rotary elements, and the frequency of this vibration increases in accordance with the vehicle speed. The speed change mechanism T also includes a brake for restricting or permitting rotation of the various rotary elements, and a plurality of friction engagement device such as clutches for connecting a plurality of the rotary elements. In this embodiment, the speed change mechanism T is a Ravigneaux-type planetary gear mechanism. Further, the speed change mechanism T includes two friction engagement device, namely a first brake B1 and a second brake B2, for selectively fixing two of the rotary elements of the planetary gear mechanism to the case C.

As shown in FIG. 2, the brakes B1, B2 are both multi-plate brakes. Therefore, the brakes B1, B2 include a plurality of friction mating plates Ba that are rotationally restricted when engaged to a spline C2d formed on the inner surface of the case C (here, the second sub case C2), and a plurality of friction plates Bb that are disposed so as to be sandwiched between two of the friction mating plates Ba and rotate integrally with each rotary element of the planetary gear mechanism when engaged to a spline formed on the outer periphery of the rotary element. The respective friction engagement device such as the brakes B1, B2 are engaged and disengaged by a hydraulic piston Bc that is operated by oil supplied from the oil pump 21 via the hydraulic control apparatus 22. By engaging and disengaging the friction engagement device, the speed change mechanism T can switch between a plurality of shift speeds having different gear ratios. Here, the input side rotary element of the speed change mechanism T is connected to the second motor generator MG2, and the output side rotary element is connected to the output shaft O. In this embodiment, the speed change mechanism T corresponds to a power transmitting "gear mechanism" of the present invention.

Case Structure

The case C houses the internal structure, including the second motor generator MG2 serving as the rotating electrical machine and the speed change mechanism T serving as the gear mechanism, in an axial-direction arrangement. As shown in FIG. 1, in this embodiment, the case C is divided into a plurality of sub cases, more specifically three sub cases that include a first sub case C1, the second sub case C2, and a third sub case C3, in order from the front side (the left side in FIG. 1). The sub cases C1 to C3 are fastened and fixed to each other by a fastening device such as a bolt. More specifically, the first sub case C1 and the second sub case C2 are fastened and fixed to each other by a bolt in a joint portion between a flange C1b provided on a rear end portion of the first sub case C1 and a flange C2a provided on a front end portion of the second sub case C2. Similarly, the second sub case C2 and the third sub case C3 are fastened and fixed to each other by a bolt in a joint portion between a flange C2b provided on a rear end portion of the second sub case C2 and a flange C3a provided on a front end portion of the third sub case C3. Note that a flange C1a for fastening and fixing the case C to the engine E is provided on a front end portion of the first sub case C1.

Here, the first sub case C1 is formed in a substantially cylindrical shape having an inner diameter and an outer diameter that widen steadily toward the front side. The damper apparatus D and the first motor generator MG1 are housed in the interior of the first sub case C1. The second sub case C2 is also formed in a substantially cylindrical shape having an inner diameter and an outer diameter that widen steadily toward the front side. The second motor generator MG2 and the speed change mechanism T are housed in the interior of the second sub case C2. Further, the hydraulic control apparatus 22 and the oil pan 23 are attached to the lower side of the second sub case C2. The power distribution mechanism SP and the oil pump 21 are housed near the joint portion between the first sub case C1 and the second sub case C2. The third sub case C3 is formed to cover the vicinity of a rear end portion of the speed change mechanism T. Further, the third sub case C3 includes a peripheral wall C3b and an end wall body C3c extending radially inward from the peripheral wall C3b. As shown in FIG. 2, the end wall body C3c supports a bearing 32 near the radial center. The bearing 32 supports the output shaft O to which the output side rotary element of the speed change mechanism T is connected.

Further, an intermediate wall body C2c extending radially inward from the inner surface of the second sub case C2 is formed integrally with the second sub case C2, and the internal space of the second sub case C2 is divided into two by the intermediate wall body C2c. The second motor generator MG2 is housed on the front side of the intermediate wall body C2c, and the speed change mechanism T is housed on the rear side of the intermediate wall body C2c. Further, as shown in FIG. 2, the intermediate wall body C2c supports a bearing 31 near the radial center. The bearing 31 supports a rotary shaft of the rotor Ro2 of the second motor generator MG2, to which the input side rotary element of the speed change mechanism T is connected. Hence, in this embodiment, a front side (input side) shaft of the speed change mechanism T is supported by the bearing 31, which is supported on the intermediate wall body C2c, and a rear side (output side) shaft thereof is supported by the bearing 32, which is supported by the end wall body C3c.

Thus, vibration caused by the meshing of the gears of the speed change mechanism T is mainly transmitted to the case C from the bearing 31 via the intermediate wall body C2c or from the bearing 32 via the end wall body C3c. Further, when either the first brake B1 or the second brake B2 is engaged, the vibration of the speed change mechanism T is also transmitted to the case C via the engaged brake B1, B2. As described above, the spline C2d for engaging the friction mating plates Ba of the first brake B1 and second brake B2 is formed on the inner surface of the second sub case C2 housing the speed change mechanism T. Therefore, the irregular shape of the spline C2d has an effect equivalent to reinforcing the region of the second sub case C2 on the outer periphery of the speed change mechanism T such that this region is comparatively rigid and unlikely to vibrate. Hence, the vibration of the speed change mechanism T that is transmitted to the case C causes a region positioned near the vibration-transmitting intermediate wall body C2c, the end wall body C3c, and the brakes B1, B2, which has low rigidity and vibrates easily, to vibrate, and as a result, a comparatively large noise is generated from this region. In this embodiment, a low rigidity region A1 on the outer periphery of the second motor generator MG2, to be described below, corresponds to this region in which vibration occurs easily. The intermediate wall body C2c is provided near the low rigidity region A1 on the outer periphery of the second motor generator MG2, and therefore the effect of the vibration that is transmitted through the intermediate wall body C2c is particularly large. Hence, in the vehicle driving apparatus 1, the silencer N is provided to cover the low rigidity region A1.

Arrangement Structure of Silencer

Figure 3:
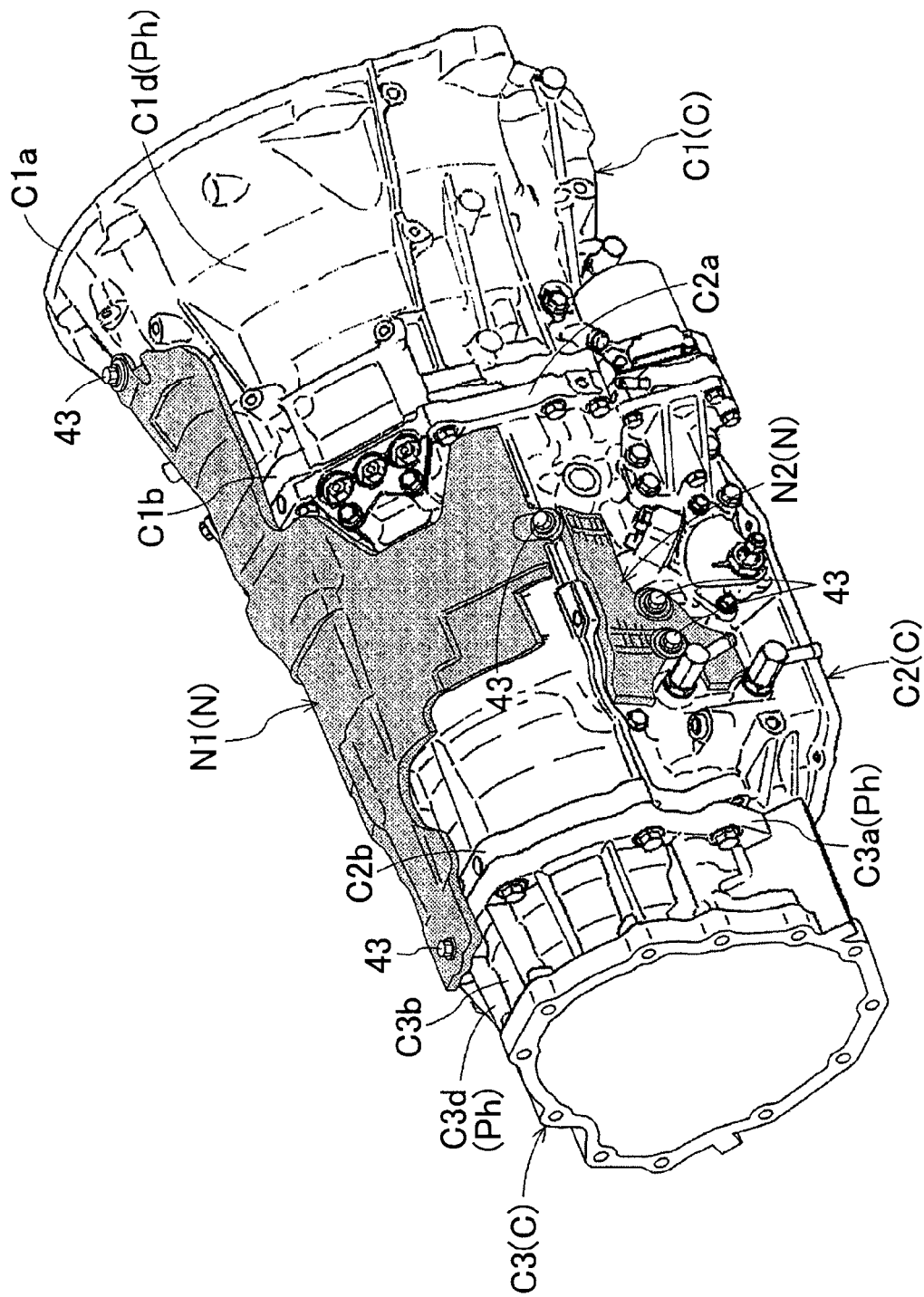
FIG. 3 is a perspective view showing the vehicle driving apparatus according to the embodiment of the present invention from an upper right rear side.
Figure 4:
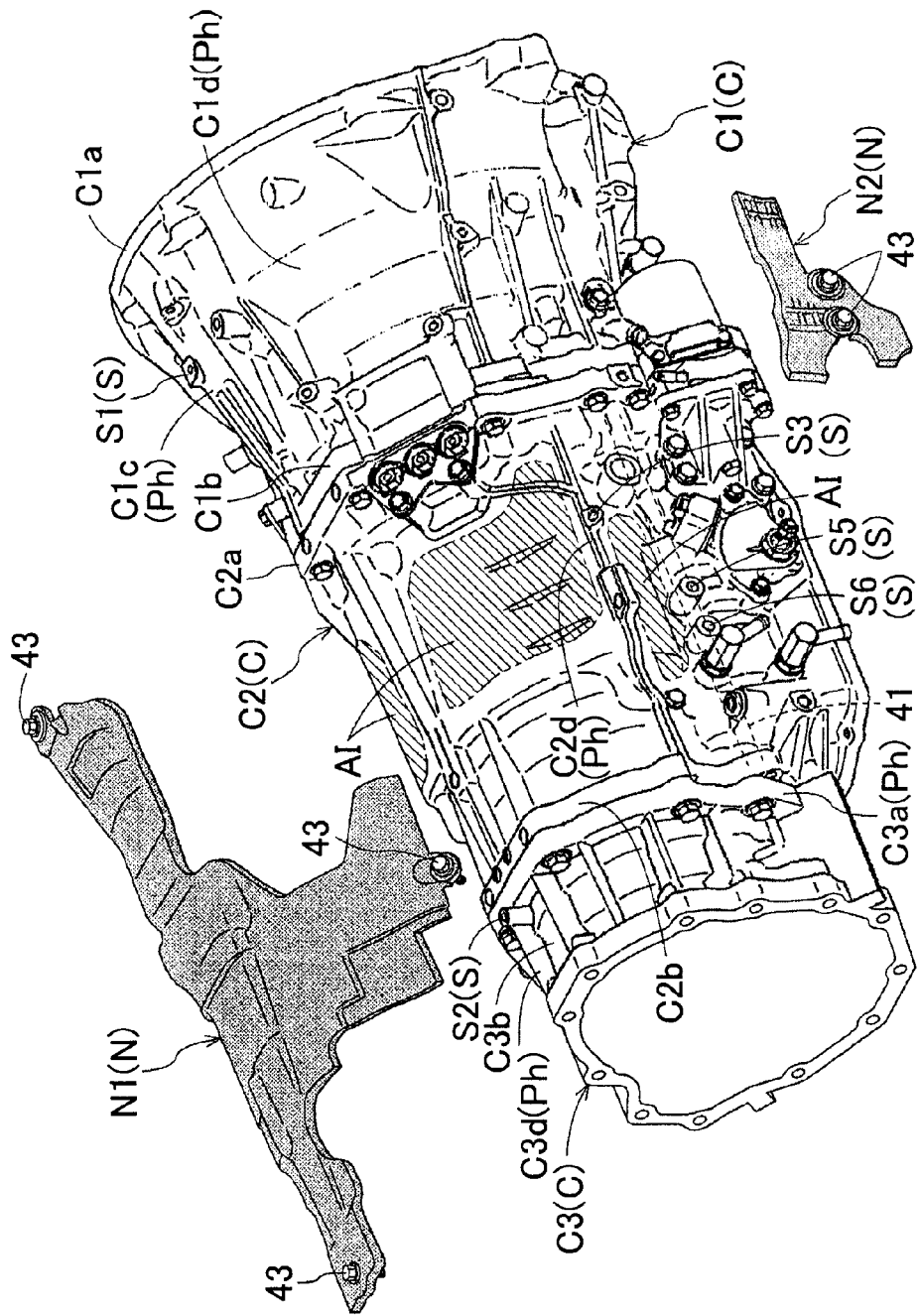
FIG. 4 is a perspective view showing the vehicle driving apparatus with a silencer removed from the upper right rear side.
Figure 5:
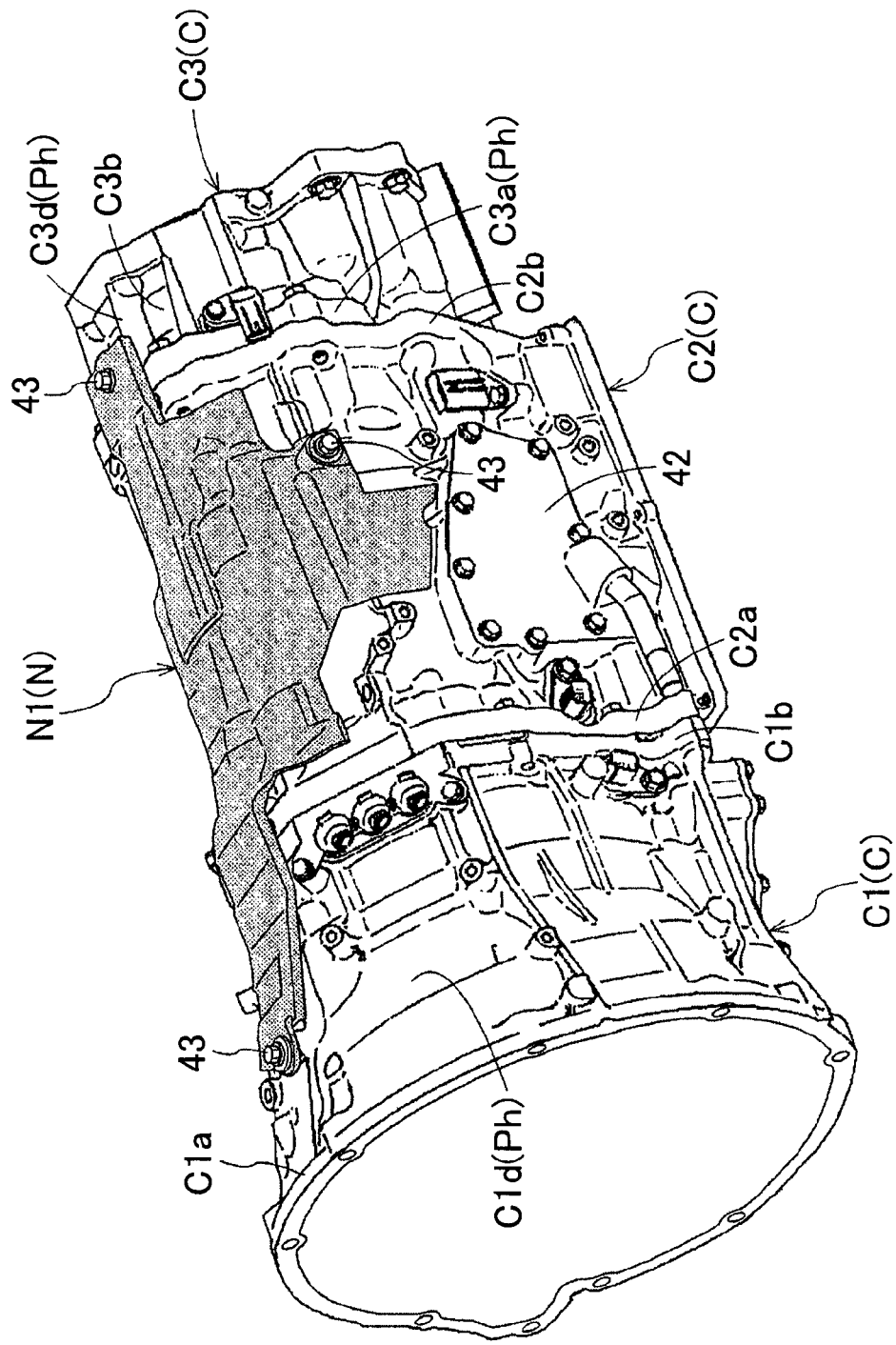
FIG. 5 is a perspective view showing the vehicle driving apparatus according to the embodiment of the present invention from an upper left front side.
Figure 6:
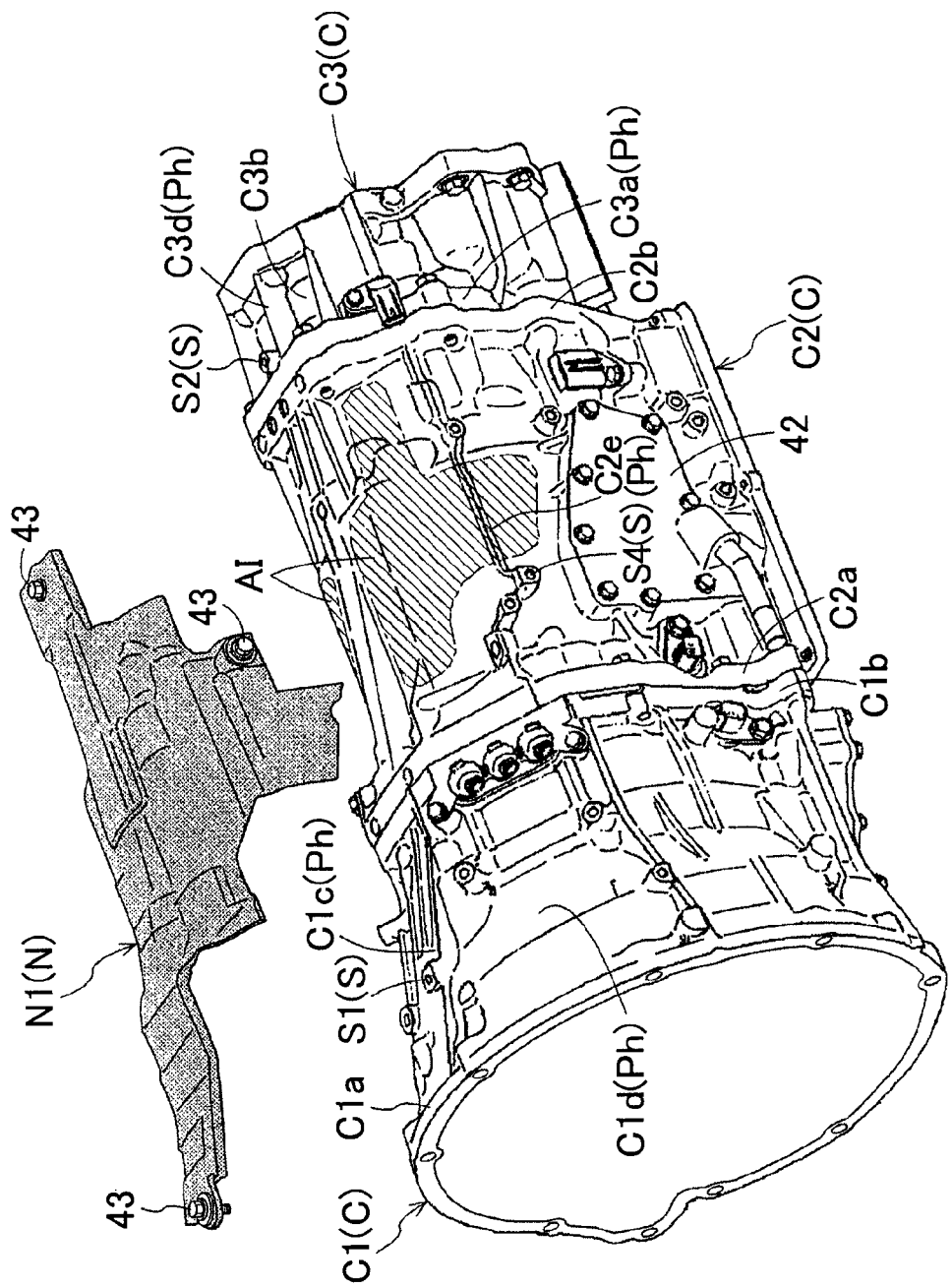
FIG. 6 is a perspective view showing the vehicle driving apparatus with the silencer removed from the upper left front side.

Next, the arrangement structure of the silencer N according to this embodiment will be described in detail using FIGS. 1 to 6. Here, FIG. 3 is a perspective view showing the vehicle driving apparatus 1 from an upper right rear side, and FIG. 4 is a perspective view showing the vehicle driving apparatus 1 with the silencer N removed from the upper right rear side. Further, FIG. 5 is a perspective view showing the vehicle driving apparatus 1 from an upper left front side, and FIG. 6 is a perspective view showing the vehicle driving apparatus 1 with the silencer N removed from the upper left front side. Note that in these drawings, the internal structure housed in the case C has been omitted. As shown in FIGS. 3 to 6, in this embodiment the vehicle driving apparatus 1 has two silencers N divided into a first silencer N1 and a second silencer N2. Note that when the term "the silencer N" is used in the following description, it is assumed that the first silencer N1 and the second silencer N2 are being referred to together.

The silencer N is a soundproofing cover (silencing cover) that covers the low rigidity region A1 of the case C, which has low rigidity and is positioned on the outer periphery of the second motor generator MG2, with the aim of suppressing noise generated from the case C of the vehicle driving apparatus 1. Further, the silencer (soundproofing cover) N is supported at high rigidity sites Ph (high rigidity regions) having a higher rigidity than the low rigidity region A1 of the case C. Here, the low rigidity region A1 of the case C is a region that forms at least a part of a peripheral wall of the second sub case C2 covering the outer periphery of the second motor generator MG2, the inner surface and outer surface of which are substantially flat. In this embodiment, as shown by the shading in FIGS. 4 and 6, of the entire region of the second sub case C2 corresponding to the outer periphery of the second motor generator MG2, an upper half region of the second sub case C2, which has a comparatively flat outer surface, and a partial region of the right side surface are the low rigidity region A1. In the vehicle driving apparatus 1, the low rigidity region A1 corresponding to the upper half region of the second sub case C2 is covered by the first silencer (first sound-proofing cover) N1, and the low rigidity region A1 corresponding to the partial right side surface region of the second sub case C2 is covered by the second silencer (second sound-proofing cover) N2.

In this embodiment, the low rigidity region A1 is the upper half region and the partial right side surface region, from the region of the second sub case C2 corresponding to the outer periphery of the second motor generator MG2, for the following reason. In the region corresponding to the outer periphery of the second motor generator MG2, the inner surface of the second sub case C2 is formed in the shape of a flat cylindrical surface in alignment with the shape of the outer peripheral surface of the stator St2. Meanwhile, the outer surface of the second sub case C2 cannot be formed with large irregularities because the upper side thereof, which serves as a vehicle cabin side, is restricted by the shape of a floor tunnel of the vehicle, and therefore the outer surface of the second sub case C2 is comparatively flat. Since both the inner surface and outer surface of the upper half region of the second sub case C2 corresponding to the outer periphery of the second motor generator MG2 are formed to be substantially flat, the upper half region of the second sub case C2 is the low rigidity region A1. Thus, the upper half region of the second sub case C2 forms a vehicle cabin side region that is fitted into the floor tunnel of the vehicle. Accordingly, the first silencer N1 of the silencer N covers at least the vehicle cabin side of the low rigidity region A1 of the case C.

Further, as shown by the broken line in FIG. 4, a parking rod 41 for operating a parking mechanism of the speed change mechanism T is disposed in the lower side interior of the right side surface of the second sub case C2. Therefore, a comparatively large cavity is formed in the interior of the right side surface of the second sub case C2. Further, the inner surface and the outer surface of the partial right side surface region of the second sub case C2 are formed to be comparatively flat. Hence, the partial right side surface region of the second sub case C2 corresponding to the outer periphery of the second motor generator MG2 is also the low rigidity region A1. As shown in FIGS. 5 and 6, the left side surface of the second sub case C2 corresponding to the outer periphery of the second motor generator MG2 is provided with a water jacket 42 having a water passage formed in its interior, and therefore has a comparatively high rigidity. Accordingly, the left side surface is not the low rigidity region A1.

Further, the silencer N is supported in the high rigidity sites Ph of the case C, which have a higher rigidity than the low rigidity region A1. Therefore, in this embodiment, a support portion S of the silencer N is provided in a plurality of locations selected from among the high rigidity sites Ph of the case C. Here, the high rigidity site Ph of the case C is a site formed with a more complicated irregularity than the low rigidity region A1 on at least one of the inner surface and the outer surface of the case C. Examples of sites that qualify as the high rigidity site Ph include sites on at least one of the inner surface and the outer surface of the case C in which a flange is formed, a spline is formed, a rib is formed, a water passage or an oil passage is formed, a step is formed, and so on. One or more support portions S may be provided on the outer surface of the case C in the respective high rigidity sites Ph. When providing the support portions S, sites that act particularly as nodes of vibration during vibration of the case C are preferably selected from among the high rigidity sites Ph described above. Here, the support portion S is a part for supporting a supported portion 15 of the silencer N. In this embodiment, as shown in FIGS. 4 and 6, each support portion S has a bolt hole in a central portion thereof, into which a fastening/fixing bolt 43 of the silencer N is screwed, and a seat surface on the periphery of the bolt hole is formed to project relative to the periphery thereof. Further, at least a part of the plurality of support portions S is provided on a different sub case (in this example, the first sub case C1 and the third sub case C3) to the sub case (in this example, the second sub case C2) having the low rigidity region A1.

In this embodiment, as shown in FIGS. 4 and 6, four support portions, namely a first support portion S1, a second support portion S2, a third support portion S3, and a fourth support portion S4, are provided on the case C as the support portions S of the first silencer N1. The first support portion S1 is provided on a rib C1c (an example of the high rigidity site Ph), which is provided so as to extend in the front-rear direction near an uppermost portion of the outer surface of the first sub case C1, in the vicinity of a step portion C1d (an example of the high rigidity site Ph) formed by an increase in the outer diameter of the front side of the first sub case C1. The second support portion S2 is provided on a rib C3d (an example of the high rigidity site Ph), which is provided so as to extend in the front-rear direction near an uppermost portion of the outer surface of the third sub case C3, in the vicinity of a flange C3a (an example of the high rigidity site Ph) formed on a front end portion of the third sub case C3. The third support portion S3 is provided on a rib C2d (an example of the high rigidity site Ph) provided on the right side portion of the second sub case C2 so as to extend in the front-rear direction. The fourth support portion S4 is provided on a rib C2e (an example of the high rigidity site Ph) provided on the left side portion of the second sub case C2 so as to extend in the front-rear direction. Hence, in this embodiment, the first support portion S1 and the second support portion S2 are provided respectively on the first sub case C1 and the third sub case C3 rather than the second sub case C2 having the low rigidity region A1. Thus, the first support portion S1 and the second support portion S2 are provided beyond the joint portions of the sub cases C1 to C3, which are formed by dividing the case C, in sites away from the low rigidity region A1.

Furthermore, in this embodiment, as shown in FIG. 4, a fifth support portion S5 and a sixth support portion S6 are provided on the case C as the support portions S of the second silencer N2. The fifth support portion S5 and sixth support portion S6 are provided adjacent to each other in the front-rear direction below the low rigidity region A1 on the right side surface of the second sub case C2.

Structure of Silencer Itself

Figure 7:
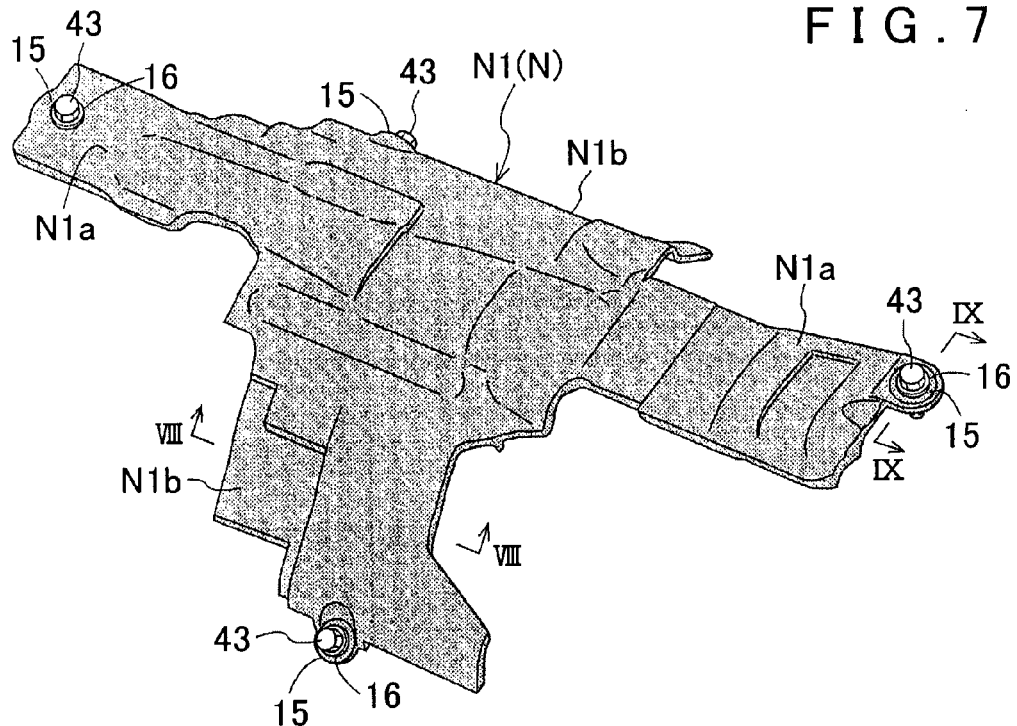
FIG. 7 is a perspective view showing a front surface side of a first silencer according to the embodiment of the present invention.
Figure 8:
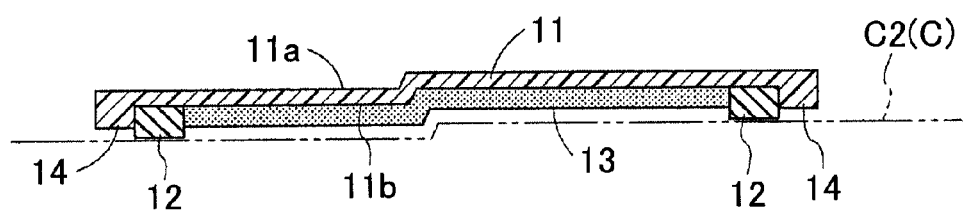
FIG. 8 is a sectional view taken along VIII-VIII in FIG. 7.
Figure 9:
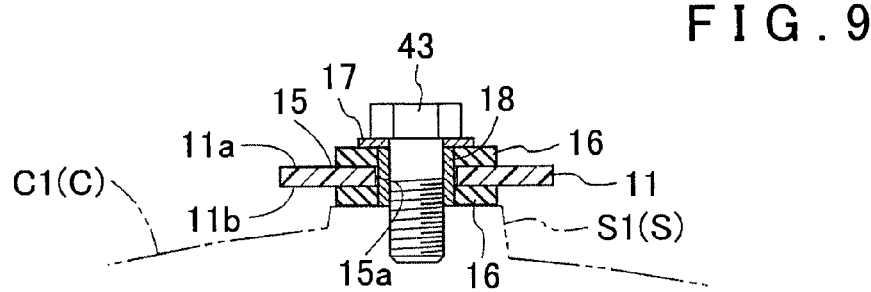
FIG. 9 is a sectional view taken along IX-IX in FIG. 7.
Figure 10:
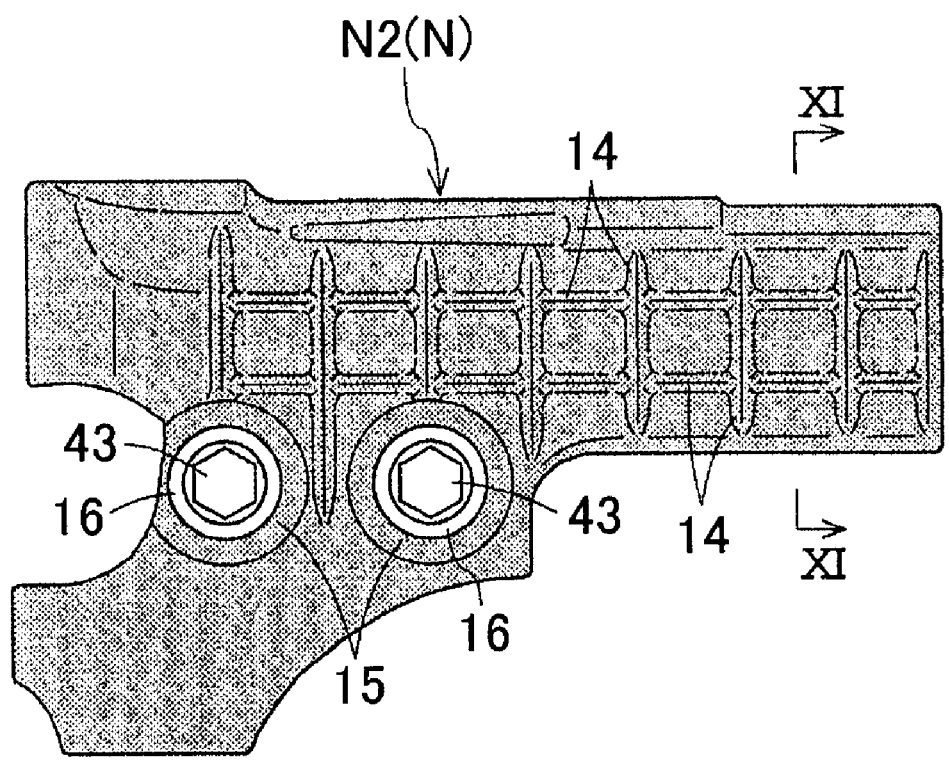
FIG. 10 is a plan view showing a front surface side of a second silencer according to the embodiment of the present invention.
Figure 11:
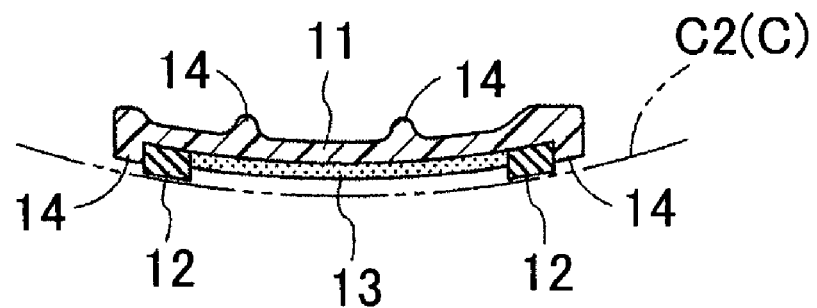
FIG. 11 is a sectional view taken along XI-XI in FIG. 10.
Figure 12:
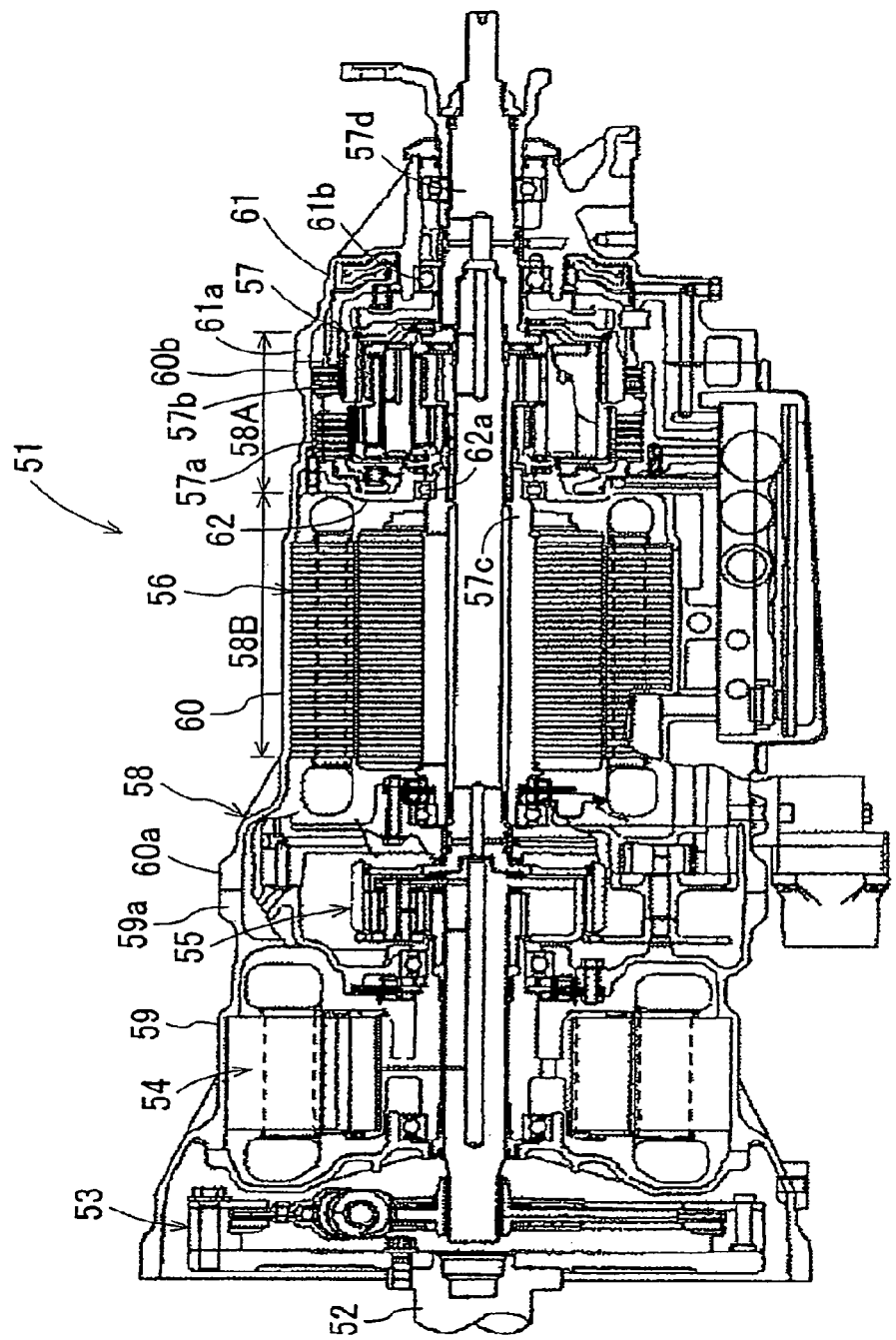
FIG. 12 is a sectional view showing the structure of a vehicle driving apparatus according to the related art.

Next, the structure of the silencer N according to this embodiment will be described in detail mainly using FIGS. 7 to 11. Here, FIG. 7 is a perspective view showing a front surface side of the first silencer N1. FIG. 8 is a sectional view taken along VIII-VIII in FIG. 7, and FIG. 9 is a sectional view taken along IX-IX in FIG. 7. FIG. 10 is a plan view showing a front surface side of the second silencer N2, and FIG. 11 is a sectional view taken along XI-XI in FIG. 10.

As shown in FIG. 7, the first silencer N1 is an axially extending portion N1a that extends in a parallel direction to the axis of the case C (the front-rear direction) so as to connect the first support portion S1 provided on the first sub case C1 and the second support portion S2 provided on the third sub case C3, and sideward extending portions N1b that extend respectively in a left-right direction from the axially extending portion N1a and are formed to cover the upper half region of the second sub case C2 corresponding to the outer periphery of the second motor generator MG2. Here, the axially extending portion N1a is formed in a strip shape that is long in the front-rear direction and has a substantially constant width, and is formed to cover the vicinity of the uppermost portion of the outer surface of the case C from the first support portion S1 to the second support portion S2. The sideward extending portions N1b extend respectively in a left-right downward direction from the vicinity of a front-rear direction intermediate portion of the axially extending portion N1a, and are formed in a shape corresponding to the shape of the low rigidity region A1 so as to cover the low rigidity region A1 in the upper half of the second sub case C2 corresponding to the outer periphery of the second motor generator MG2. The supported portions 15 supported by the support portions S are provided in positions of the first silencer N1 corresponding to the support portions S (S1 to S4) of the case C. The structure of the supported portion 15 will be described in detail later on the basis of FIG. 9.

As shown in FIG. 8, the first silencer N1 includes a sealing member 12 provided on at least an outer peripheral edge of a rear surface 11b, which is the surface of a silencer main body 11 that opposes the case C, and a sound absorbing member 13 provided in a region of the rear surface 11b surrounded by the sealing member 12. Here, the silencer main body (soundproofing cover main body) 11 is a plate-shaped member that includes the aforementioned axially extending portion N1a and the sideward extending portions N1b, and is formed with a substantially arc-shaped left-right direction cross-section so as to align with the outer surface shape of the case C. A reinforcing rib 14 is provided on at least the outer peripheral edge of the silencer main body 11. In this example, the reinforcing rib 14 is provided around substantially the entire circumference of the outer peripheral edge of the rear surface 11b of the silencer main body 11. Here, the silencer main body 11 is preferably formed from a material having a higher rigidity than the sealing member 12 and the sound absorbing member 13, such as a polyamide-based resin (nylon) or the like, for example.

The sealing member 12 functions to seal the space on the rear surface 11b side of the first silencer N1 by contacting the outer surface of the case C around the entire circumference of the outer peripheral edge of the first silencer N1. For this purpose, the sealing member 12 is provided so as to project further toward the case C side than the reinforcing rib 14 around the entire circumference of the outer peripheral edge of the rear surface 11b of the silencer main body 11. The sealing member 12 is preferably formed from a material that is highly elastic and exhibits a superior sealing property when in contact with the outer surface of the case C, for example, foaming rubber or the like. The sound absorbing member 13 functions to absorb sound generated in the space sealed by the sealing member 12 on the rear surface 11b side of the first silencer N1. For this purpose, the sound absorbing member 13 is adhered to the rear surface 11b of the silencer main body 11 so as to cover the entirety of the region of the rear surface 11b of the silencer main body 11 that is surrounded by the sealing member 12, and is also provided to remove from the outer surface of the case C in the state where the first silencer N1 is attached to the case C. The sound absorbing member 13 is preferably formed from a material that exhibits superior sound absorption, for example urethane or the like.

Further, as shown in FIG. 7, the first silencer N1 includes the supported portions 15 in positions corresponding respectively to the first through fourth support portions S1 to S4 provided on the case C. In this embodiment, the supported portion 15 is provided with a bolt through hole 15a in a position of the silencer main body 11 corresponding to the bolt hole of the support portion S, as shown in FIG. 9, which is a sectional view of the supported portion 15 corresponding to the first support portion S1. Further, a bolt 43 serving as a fastening device for fastening the first silencer N1 to the support portion S of the case C and a cylindrical collar 18 disposed on the outer periphery of the bolt 43 are inserted into the bolt through hole 15a. The collar 18 functions to maintain the elasticity of a vibration-proofing member 16, to be described below, at an appropriate level by restricting the tightening height of the bolt 43 such that the vibration-proofing member 16 is prevented from being compressed when the bolt 43 is tightened. The first silencer N1 is supported on the case C via the vibration-proofing member 16. More specifically, in this embodiment, the vibration-proofing member 16 is disposed on both surfaces of the supported portion 15 of the silencer main body 11 such that the supported portion 15 of the first silencer N1 contacts the case C and the bolt 43 via the vibration-proofing member 16. Here, the vibration-proofing member 16 is a disk-shaped member provided with a bolt through hole in its center. Further, in this example, a washer 17 is interposed between the vibration-proofing member 16 disposed on a front surface 11a side of the silencer main body 11 and a head portion of the bolt 43. The vibration-proofing member 16 is preferably formed from a material that exhibits superior vibration absorption, for example a rubber material or the like.

As shown in FIG. 10, the second silencer N2 is the silencer N that covers the low rigidity region A1 on the right side surface of the second sub case C2. Accordingly, the second silencer N2 is formed in a shape that corresponds to the shape of the low rigidity region A1 on the right side surface of the second sub case C2, which corresponds to the outer periphery of the second motor generator MG2. The supported portions 15 supported by the respective support portions S are provided in positions of the second silencer N2 corresponding to the support portions S (S5, S6) of the case C. The supported portions 15 are structured similarly to those of the first silencer N1.

Further, the structure of the second silencer N2 other than the planar shape along the outer surface of the case C is similar to that of the first silencer N1 described above. More specifically, as shown in FIG. 11, the second silencer N2 includes the sealing member 12 provided on at least the outer peripheral edge of the rear surface 11b, which is the surface of the silencer main body 11 that opposes the case C, and the sound absorbing member 13 provided in the region of the rear surface 11b surrounded by the sealing member 12. Here, the silencer main body 11 is a plate-shaped member, the up-down direction cross-section (the XI-XI cross-section in FIG. 10) of which is formed substantially in an arc shape bent in an opposite direction to the first silencer N1 so as to align with the shape of the outer surface of the case C. The reinforcing rib 14 is provided on at least the outer peripheral edge of the silencer main body 11. In this example, the silencer main body 11 of the second silencer N2 is provided with the reinforcing rib 14, which extends around substantially the entire circumference of the outer peripheral edge of the rear surface 11b thereof, and also a lattice-shaped reinforcing rib 14 formed over substantially the entirety of the front surface 11a thereof.

The sealing member 12 functions to tightly seal the rear surface 11b side of the second silencer N2 by contacting the outer surface of the case C around the entire circumference of the outer peripheral edge of the second silencer N2. For this purpose, the sealing member 12 is provided so as to project further toward the case C side than the reinforcing rib 14 around the entire circumference of the outer peripheral edge of the rear surface 11b of the silencer main body 11. The sound absorbing member 13 functions to absorb sound generated in the space sealed by the sealing member 12 on the rear surface 11b side of the second silencer N2. For this purpose, the sound absorbing member 13 is adhered to the rear surface 11b of the silencer main body 11 so as to cover the entirety of the region of the rear surface 11b of the silencer main body 11 that is surrounded by the sealing member 12, and is also provided to be removed from the outer surface of the case C. Note that the materials of the silencer main body 11, the sealing member 12, the sound absorbing member 13, and the vibration-proofing member 16 of the second silencer N2 are preferably identical to the materials of their counterparts in the first silencer N1 described above.

Other Embodiments (1) In the above embodiment, an example in which the silencer N includes two silencers, namely the first silencer N1 and the second silencer N2, was described. However, the silencer N is not limited to this structure, and in another preferred embodiment of the present invention, a single silencer N, or three or more silencers N, may be provided.

(2) In the above embodiment, an example in which the silencer N covers at least the vehicle cabin side of the low rigidity region A1 of the case C was described. However, the silencer N is not limited to this structure, and when the low rigidity region A1 does not exist on the vehicle cabin side, the silencer N may be structured to cover only a region of the case C other than the vehicle cabin side.

(3) In the above embodiment, an example in which the silencer N is supported on the case C via the vibration-proofing member 16 was described. However, the silencer N is not limited to this support structure, and in another preferred embodiment of the present invention, the silencer N may be supported on the case C directly, without interposing the vibration-proofing member 16, or via another member.

(4) In the above embodiment, an example was described in which the silencer N includes the sealing member 12 provided on at least the outer peripheral edge of the rear surface 11b, which is the surface of the silencer main body 11 that opposes the case C, and the sound absorbing member 13 provided in the region of the rear surface 11b surrounded by the sealing member 12. However, the silencer N is not limited to this structure, and in another preferred embodiment of the present invention, for example, the sealing member 12 is not provided, and only the sound absorbing member 13 is provided on the rear surface 11b of the silencer main body 11.

(5) In the above embodiment, an example in which the reinforcing rib 14 is provided on at least the outer peripheral edge of the silencer main body 11 of the silencer N was described. However, the silencer N is not limited to this structure, and in another preferred embodiment of the present invention, the reinforcing rib 14 need not be provided, for example, when sufficient strength can be secured in the silencer main body 11.

(6) In the above embodiment, an example in which the intermediate wall body C2c and the bearing 31 supported thereon are provided between the second motor generator MG2 serving as the "rotating electrical machine" and the speed change mechanism T serving as the "gear mechanism" in the interior of the second sub case C2 of the case C was described. However, the silencer N according to the present invention may also be used favorably when the case C does not include the intermediate wall body C2c and the bearing 31. In this case, the front side (input side) shaft of the speed change mechanism T serving as the "gear mechanism" is supported by the rear side (output side) shaft of the second motor generator MG2.

(7) In the above embodiment, an example in which the case C is divided into the three sub cases C1 to C3 was described. However, the case C of the vehicle driving apparatus 1 is not limited to this structure, and may be divided into two, or four or more, sub cases. Alternatively, an integrated case C having no sub cases may be provided.

(8) In the above embodiment, an example in which the speed change mechanism T, which is capable of switching between a plurality of shift speeds, is provided as the power transmitting "gear mechanism" of the present invention was described. However, the "gear mechanism" of the present invention is not limited to this structure, and in another preferred embodiment of the present invention, a simple reduction gear mechanism, a speed increasing gear mechanism, or similar may be provided in place of the speed change mechanism T.

(9) In the above embodiment, an example in which the second motor generator MG2, when both the first and second motor generators MG1, MG2 are provided, corresponds to the "rotating electrical machine" of the present invention was described. However, the "rotating electrical machine" of the present invention is not limited to this structure, and in another preferred embodiment of the present invention, when only one motor generator is provided, this motor generator may serve as the "rotating electrical machine" of the present invention. Alternatively, a motor or a generator may be used as the "rotating electrical machine" of the present invention.

(10) In the above embodiment, an example in which the speed change mechanism T serving as the "gear mechanism" of the present invention is arranged axially to the rear of the second motor generator MG2 serving as the "rotating electrical machine" was described. However, the "rotating electric machine" and the "gear mechanism" are not limited to this arrangement relationship, and the front-rear relationship thereof may be reversed, or a structural member other than the intermediate wall body C2c may be disposed between the "rotating electrical machine" and the "gear mechanism."

(11) In the above embodiment, a case in which the vehicle driving apparatus 1 is a split system hybrid vehicle driving apparatus including both the first and second motor generators MG1, MG2 was described. However, the present invention may be applied similarly to a hybrid vehicle driving apparatus employing a system other than the split system, such as a series system or a parallel system. The present invention may also be applied to a driving apparatus for various vehicles other than a hybrid vehicle, such as an electric automobile, for example.

Note that in the present application, "rotating electrical machine" is used as a concept that includes any one of a motor, a generator, and a motor generator that functions as both a motor and a generator, as necessary.

Typically, the region of the case on the outer periphery of the rotating electrical machine is formed in a flat cylindrical surface shape in alignment with the outer peripheral shape of the rotating electrical machine, and therefore often tends to have low rigidity. In contrast, various structures are often provided in the region on the outer periphery of the gear mechanism, and therefore this region tends to have higher rigidity than the region on the outer periphery of the rotating electrical machine. Hence, more of the vibration of the gear mechanism is transmitted to the low rigidity region on the outer periphery of the rotating electrical machine, the rigidity of which is lower than the region on the outer periphery of the gear mechanism, and when this low rigidity region vibrates, a comparatively large noise is often generated. According to an exemplary aspect of the invention, when the rotating electrical machine and the gear mechanism are housed in the case in series in the axial direction, the low rigidity region on the outer periphery of the rotating electrical machine, the rigidity of which is lower than the region on the outer periphery of the gear mechanism, is covered by the silencer, and therefore noise generated when the vibration of the gear mechanism is transmitted to the low rigidity region as described above can be muffled effectively. Furthermore, at this time, because the silencer is supported in the high rigidity sites having a higher rigidity than the low rigidity region, noise generated when the silencer itself vibrates greatly can also be prevented. As a result, noise generated by a vibration of the gear mechanism can be suppressed effectively, and the quietness of the vehicle can be improved.

Here, the low rigidity region of the case is a region that forms at least a part of a peripheral wall covering the outer periphery of the rotating electrical machine, an inner surface and an outer surface of which are formed to be substantially flat. This type of low rigidity region has low rigidity even in the interior of the case and vibrates easily, and is therefore likely to become a source of noise generation. By covering the low rigidity region with the silencer, noise from the case can be suppressed effectively.

Further, the high rigidity sites of the case are sites in which a more complicated irregularity than the low rigidity region is formed on at least one of the inner surface and the outer surface of the case. Examples of a site formed with a more complicated irregularity than the low rigidity region include a site in which a flange is formed, a site in which a spline is formed, a site in which a rib is formed, a site in which a water passage or an oil passage is formed, a site in which a step is formed, and so on. In such a site, the irregularity functions as a rib for reinforcing the case, and therefore the rigidity of the site becomes higher than the rigidity of the low rigidity region. By supporting the silencer in such high rigidity sites, vibration of the silencer itself can be suppressed, and therefore noise from the silencer can be suppressed.

According to an exemplary aspect of the invention, the support portion provided on a different sub case to the sub case having the low rigidity region is provided in a high rigidity site beyond a joint portion of the sub cases and a flange or the like provided in the joint portion, and away from the low rigidity region. Therefore, the silencer can be supported by a support portion that is even less likely to vibrate than a support portion provided on the same sub case. As a result, vibration of the silencer itself can be suppressed even more effectively, and therefore noise from the silencer can be suppressed.

According to an exemplary aspect of the invention, the vibration of the case can be prevented from being transmitted to the silencer. Hence, vibration of the silencer itself can be suppressed even more effectively, and therefore noise from the silencer can be suppressed.

According to an exemplary aspect of the invention, vibration of the silencer due to a lack of rigidity in the silencer can be suppressed, and therefore noise from the silencer can be suppressed effectively.

According to an exemplary aspect of the invention, the space on the rear surface side of the silencer is sealed by the sealing member, and sound in the space sealed by the sealing member on the rear surface side of the silencer can be absorbed by the sound absorbing member. As a result, noise from the case on the rear surface side of the silencer can be suppressed even more effectively.

According to an exemplary aspect of the invention, noise emitted from the vehicle driving apparatus to the vehicle cabin side can be suppressed effectively, and therefore quietness in the vehicle cabin can be improved.

According to an exemplary aspect of the invention, even when the silencer is divided into the low rigidity region of the case on the upper half of the outer periphery of the rotating electrical machine and the low rigidity region of the case on the side face of the rotating electrical machine, the low rigidity region can be covered appropriately without increasing the size of the silencer more than necessary, and as a result, noise from the case can be suppressed.

According to an exemplary aspect of the invention, vibration of the gear mechanism is transmitted to the low rigidity region of the case on the outer periphery of the rotating electrical machine via the bearing and the intermediate wall body provided between the rotating electrical machine and the gear mechanism, i.e. over a comparatively short transmission distance. Hence, with this structure, the vibration of the gear mechanism is transmitted to the low rigidity region easily with little attenuation such that a comparatively large noise is highly likely to be generated in the low rigidity region. Accordingly, the noise suppression effect obtained by covering the low rigidity region with the silencer is exhibited even more strikingly.

What is claimed is:

1. A vehicle driving apparatus comprising:
   a rotating electrical machine;
   a power transmitting gear mechanism; and
   a case in which the rotating electrical machine and the gear mechanism are housed in series in an axial direction of the rotating electrical machine,
   wherein a low rigidity region, which is a region of the case having low rigidity located at an outer periphery of the rotating electrical machine, is covered by a silencer supported on a high rigidity region of the case having a higher rigidity than the low rigidity region.

2. The vehicle driving apparatus according to claim 1, wherein the low rigidity region is a region of the case that forms at least a part of a peripheral wall covering the outer periphery of the rotating electrical machine, an inner surface and an outer surface of which are formed to be substantially flat.

3. The vehicle driving apparatus according to claim 2, wherein the high rigidity region of the case is a region in which a more complicated cross section or surface than the low rigidity region is formed on at least one of the inner surface and the outer surface of the case.

4. The vehicle driving apparatus according to claim 3, wherein:
   the case is divided into a plurality of sub cases, and a plurality of support portions of the silencer is provided at a plurality of locations selected from high rigidity regions of the case, and
   at least a part of the plurality of support portions being provided on a different sub case to the sub case that houses the rotating electrical machine and includes the low rigidity region.

5. The vehicle driving apparatus according to claim 4, wherein the silencer is supported on the case via a vibration-proofing member.

6. The vehicle driving apparatus according to claim 5, wherein the silencer comprises a reinforcing rib on at least an outer peripheral edge of a silencer main body.

7. The vehicle driving apparatus according to claim 6, wherein the silencer comprises a sealing member provided on at least an outer peripheral edge of a rear surface, which is a surface of the silencer main body opposing the case, and a sound absorbing member provided in a region of the rear surface surrounded by the sealing member.

8. The vehicle driving apparatus according to claim 7, wherein the silencer covers at least a vehicle cabin side of the low rigidity region of the case.

9. The vehicle driving apparatus according to claim 8, wherein the silencer is divided into a plurality of silencers respectively covering at least the low rigidity region of the case located at an upper half of the outer periphery of the rotating electrical machine and the low rigidity region of the case located at a side face of the rotating electrical machine.

10. The vehicle driving apparatus according to claim 9, wherein at least a bearing for supporting a rotary shaft of the gear mechanism and an intermediate wall body for supporting the bearing on the case are provided between the rotating electrical machine and the gear mechanism.

11. The vehicle driving apparatus according to claim 1, wherein the high rigidity region of the case is a region in which a more complicated cross section or surface than the low rigidity region is formed on at least one of an inner surface and an outer surface of the case.

12. The vehicle driving apparatus according to claim 1, wherein:
   the case is divided into a plurality of sub cases, and a plurality of support portions of the silencer is provided at a plurality of locations selected from high rigidity regions of the case, and
   at least a part of the plurality of support portions being provided on a different sub case to the sub case that houses the rotating electrical machine and includes the low rigidity region.

13. The vehicle driving apparatus according to claim 1, wherein the silencer is supported on the case via a vibration-proofing member.

14. The vehicle driving apparatus according to claim 1, wherein the silencer comprises a reinforcing rib on at least an outer peripheral edge of a silencer main body.

15. The vehicle driving apparatus according to claim 1, wherein the silencer comprises a sealing member provided on at least an outer peripheral edge of a rear surface, which is a surface of a silencer main body opposing the case, and a sound absorbing member provided in a region of the rear surface surrounded by the sealing member.

16. The vehicle driving apparatus according to claim 1, wherein the silencer covers at least a vehicle cabin side of the low rigidity region of the case.

17. The vehicle driving apparatus according to claim 1, wherein the silencer is divided into a plurality of silencers respectively covering at least the low rigidity region of the case located at an upper half of the outer periphery of the rotating electrical machine and the low rigidity region of the case located at a side face of the rotating electrical machine.

18. The vehicle driving apparatus according to claim 1, wherein at least a bearing for supporting a rotary shaft of the gear mechanism and an intermediate wall body for supporting the bearing on the case are provided between the rotating electrical machine and the gear mechanism.

19. A vehicle driving apparatus comprising:
   a rotating electrical machine;
   a power transmitting gear mechanism;
   a case in which the rotating electrical machine and the gear mechanism are housed in series in an axial direction of the rotating electrical machine; and
   a silencer placed on a portion of the case, wherein the silencer covers a region of the case that is opposite an outer periphery of the rotating electrical machine, and the silencer is supported on a region of the case that is opposite the gear mechanism.

20. The vehicle driving apparatus of claim 19, where the region of the case that is opposite the outer periphery of the rotating electrical machine is substantially flat relative to the region of the case that is opposite the gear mechanism.

* * * * *